United States Patent [19]

Read

[11] 3,889,011

[45] June 10, 1975

[54] FAT PRODUCTS
[75] Inventor: Colin Barrington Read, Gravesend, England
[73] Assignee: Lever Brothers Company, New York, N.Y.
[22] Filed: Sept. 4, 1973
[21] Appl. No.: 393,864

Related U.S. Application Data
[63] Continuation of Ser. No. 164,442, July 20, 1971, abandoned.

[30] Foreign Application Priority Data
July 23, 1970 United Kingdom............... 35874/70

[52] U.S. Cl. ............................................... 426/604
[51] Int. Cl................................................. A03b 1/00
[58] Field of Search ............ 426/194, 199, 200, 362, 426/336, 341

[56] References Cited
UNITED STATES PATENTS

| | | | |
|---|---|---|---|
| 3,353,964 | 11/1967 | Seiden | 99/118 |
| 3,597,229 | 8/1971 | Mijnders | 99/122 R |
| 3,607,305 | 9/1971 | Westenberg | 99/122 R |
| 3,796,581 | 3/1974 | Frommhold | 426/194 |

Primary Examiner—Wilbur L. Bascomb, Jr.
Assistant Examiner—Hiram H. Bernstein
Attorney, Agent, or Firm—Lever Brothers Company

[57] ABSTRACT

Margarine fats suitable for use in the preparation of plastic emulsion food spreads such as margarine, contain a randomised palmitic acid as the principal saturated fatty acid, together with at least 3% trans acid and comprise an interesterified palmitic fat of vegetable or animal origin, which is preferably corandomised with a vegetable oil to provide a maximum saturated fatty acid content in the margarine fat of 35% and a dilation value of at most 90 at 35°C and at least 275 at 20°C. A wide variety of margarine can be prepared according to the invention having favourable melting characteristics and particularly a soft tub margarine which can be spread directly at domestic refrigerator temperatures. High proportions of palmitic fat, especially palm oil and cottonseed oil, may be incorporated into the margarine fat formulations of the invention.

6 Claims, No Drawings 3,889,011

FAT PRODUCTS

This is a continuation of application Ser. No. 164,442, filed July 20, 1971, now abandoned.

BACKGOUND OF THE INVENTION

1. Field of the Invention

This invention relates to edible fat compositions suitable for making margarine and like water-in-oil emulsion food spreads which are normally plastic and to margarine and like spreads made therefrom as well to processes for the preparation of margarine and the fat thereof.

The invention is particularly concerned with so-called soft margarine which can be spread at refrigerator temperatures.

In the more particular embodiment the invention relates to margarine fat consisting essentially of a randomised palmitic acid and containing at least 3% trans acid.

In a specific embodiment the invention relates to a margarine fat based on an interesterified blend of a palmitic fat and a vegetable oil, in which the principal saturated fatty acid is randomised palmitic acid and in which, in addition to a trans content of at least 3%, the total saturated fatty acid content is at most 35%.

The fat compositions on which margarine and similar water-in-oil emulsion food spreads are based, largely determine the physical characteristics of the product upon which their usefulness depends. The foremost of these requirements of an emulsion food spread is the combimation of good oral response with satisfactory physical characteristics enabling these products to be spread satisfactorily on bread and other foodstuffs.

For good oral response a fat-based emulsion food product must conform to certain critical requirements in the region of body temperature, particularly with regard to its melting characteristics. Such products should therefore melt rapidly in the mouth and provide a cool organoleptic response. While it may be quite readily perceived that in meeting these requirements substantially the whole of the fat should be melted at body temperature, this characteristic by no means meets all the requirements for satisfactory oral response and consideration must also be given to the change in the solids content of the fat as it reaches body temperature.

In the formulation of margarine and similar food-spreads, attention must also be paid to the behaviour of the products when spread on bread and the like. In this area of properties also the behaviour of these products is largely determined by the melting characteristics of the fat phase. Thus, while the greater part of the fat should melt at or below body temperature, at lower temperatures the product should be sufficiently firm, not only to provide for plastic deformation when the product is spread, but also to resist the tendency, apparent in very soft products, for oil to separate from the emulsion structure.

Moreover, in more recent times considerable demand has been created for a product which, while remaining stable and resisting oiling-out, nevertheless is sufficiently soft to be spread, not only at ambient temperature ie about 20°C, but also at the substantially lower temperatures, down to about 5°C, provided in domestic refrigerators, so that margarines may be stored in a refrigerator and spread directly therefrom.

In meeting the requirements both for oral response and spreadability, close attention must be paid to the melting characteristics of the fat and glyceride oils which may be used, for their importance in affecting the behaviour of the product. For example, the rate of chilling and the extent of working the emulsion to provide a plastic spread exert a profound effect on its properties. Although current demand is particularly directed in favour of the so-called soft margarines, both these and the firmer print type are based in general upon a blend of an oil, particularly one rich in polyunsaturated glycerides, with a harder and often hydrogenated hardstock. Prior to the present invention however, palm oil has been used in relatively small proportions as a hardstock, owing to its tendency to postharden, giving a less desirable product on storage.

2. The Prior Art

It has been known in the margarine and shortening art for some considerable time that the properties of fats and glyceride oils may be modified to meet the often conflicting requirements of fat blends used in these fields by interesterifying all or an essential part of the fat. Further, fats in this field have been hardened by catalytic hydrogenation using a variety of techniques.

Representative prior-art teachings are given below:

Interesterification as a technique for modifying the properties of lard and other animal fats is described in "Margarine," second edition, Anderson and Williams 1954 p 31 and a general description of the technique is given on pages 54, et seq.

A randomised blend of palm and coconut oils has been widely used in margarine. The tendency of this blend to appear grainy in texture has been considered in British Pat. No. 874,675, according to which a proportion of an uninteresterified lauric fat is added to the randomised blend.

According to Seldon in U.S. Pat. No. 3,353,964, the tendency of margarine to exude oil above 70°F is overcome by incorporating in the margarine fat a corandomised blend of coconut oil with substantially hydrogenated rapeseed oil.

Melnick in U.S. Pat. No. 2,921,855 describes a margarine fat comprising a corandomised blend of a polyunsaturated oil with a highly hydrogenated fat in which therefore the trans content is negligible.

Nelson in U.S. Pat. No. 2,855,311 discloses the interesterification of a predominantly $C_{16}$ fat such as palm oil with a variety of liquid oils, either to produce a hardstock in which the triglycerides are substantially completely hydrogenated to give a sufficiently high titer, or to provide a base oil which may be partly hydrogenated but as to the trans content of which the Patentee is silent.

U.S. Pat. Nos. 2859119 and 2859120 refer to the use of blends of lauric fats with partly hardened soyabean oil which are interesterified but in which compositions the use of palmitic fats is not described nor are these compositions in which palmitic acid is the predominant fatty acid of the composition.

This invention relates to margarine and similar fat products and to fat compositions suitable for the preparation of such fats.

Margarine is essentially a plastic spread in which an aqueous phase, often containing milk or milk solids, is emulsified in an edible fat. The consistency of margarine and similar products, in which somewhat lower amounts of fat may be incorporated, largely derives from that of its fat composition. This may comprise several constituents, usually including liquid and solid fat constituents.

In the manufacture of margarine and other fatty emulsion food spreads, the properties of naturally occurring fats and glyceride oils have been modified by various techniques, including hardening and interesterifying to meet the critical requirements of the product. Among these possibly the most exacting to meet is the provision of good melting characteristics, to achieve a cool, butter-like melting of the product in the mouth ie in the region of body temperature, about 35°C while ensuring that at ambient temperature ie about 20°C, the product retained sufficient body to spread well. These characteristics are related to the solids content of the margarine fat of the temperatures concerned, and may be determined by reference to the stabilised dilatations of the oil discussed below.

The present invention provides a margarine fat formulation having improved melting characteristics. The invention therefore provides a margarine fat suitable for use in margarine and other plastic emulsion food spreads and containing as the principal saturated acid randomised palmitic acid and at least 3% trans acid, the said fat comprising an interesterified palmitic fat, preferably in a corandomised blend with a vegetable fat to provide a maximum of 35% saturated fatty acid in the margarine fat and a dilatation value for the margarine fat at 20° of at least 275 and of at most 90 at 35°C.

The invention also provides a process for the preparation of a margarine fat as described, comprising blending, randomising and isomerising a palmitic fat and a vegetable oil to afford in the margarine fat at least 3% trans acid, and as the principal saturated fatty acid randomly distributed palmitic acid, and preferably to an extent and in proportions whereby the dilatation of the margarine fat at 20° is at least 275 and is at most 90.

The palmitic fat in the compositions of the invention contains at least 20% palmitic acid and is preferably a vegetable oil, eg palm or cottonseed oil, although animal fats, eg, tallow and lard may be used. Preferably substantially the entire margarine fat is interesterified but additional minor amounts ie up to 20%, but preferably up to 10% of uninteresterified components may also be present.

The trans acid may be furnished either by the palmitic fat or by the vegetable oil. For this purpose either is modified by a process involving isomerisation of part of its unsaturated acid content. This may be conveniently effected by light hydrogenation, particularly in the presence of a selective catalyst which hydrogenate polyunsaturated acids, particularly linolenic acid, without substantially increasing the saturated fatty acid content of the hydrogenated fat or oil. It is particularly convenient to effect the isomerisation by partial hydrogenation, in the presence of a selected catalyst, of soybean oil, which is made more stable against deterioration by the hydrogenation of substantial amounts of linolenic acid normally present in this oil, The trans acid may be trans oleic, trans palmitoleic or trans, trans linoleic acid.

The blending, interesterification and isomerisation/hydrogenation steps in the process of the invention may be carried out in any order. For example, a polyunsaturated liquid vegetable oil may be first lightly hydrogenated by a decrease in IV of, eg, 5–30, to furnish a sufficient amount of trans acid in the oil to provide at least 3% in the final magarine fat, and the modified liquid oil then blended and interesterified with the palmitic fat. Alternatively, the palmitic acid may itself be lightly hydrogenated to provide the necessary trans acid, blended and interesterified with the liquid vegetable oil. In a third method of operation the two principal components may be blended together, interesterified and lightly hydrogenated to provide the trans acid.

By means of the invention a substantial proportion — as much as 60% or more by weight of the total fat content — of palm oil may be incorporated into margarine without resulting in the excessive post-crystallisation tendency which characterises palm oil itself.

The invention is very useful for providing margarine fat containing from 25 to 65% of palm oil, but particularly suitable margarine fat is provided by the invention containing palm oil corandomised with approximately equal parts of liquid vegetable oil. With higher proportions of palm oil a suitable consistency becomes very difficult to obtain.

Suitable liquid oil with which the palm oil or other palmitic fat may be interesterified include soybean oil, melonseed, groundnut oil, safflower oil, sunflower oil, cottonseed oil and corn oil. Such oils may also be used without interesterification in minor amounts in the compositions of the invention, as additive oils apart from $C_{16-18}$ sources, lauric oils and $C_{22}$ oils eg rapeseed oil, may be used in the invention.

Soybean oil is particularly preferred in the invention as the liquid vegetable oil corandomised with the palm oil. In the preparation of soft margarines i.e. tub margarines capable of spreading directly from the refrigerator it is desirable to avoid a product which appears oily at ordinary ambient temperatures, e.g., about 20°C. In providing a margarine fulfilling this requirement while containing as much as 50% or even more palm oil and avoiding slow-melting which confers a cloying taste, soybean oil is particularly satisfactory and cheap. It may be slightly hardened before use in the invention to improve its resistance to the development of off-flavours, and to provide the source of trans acids as may other liquid vegetable oils used in the invention. Vegetable oils which are semi-solid, for example coconut oil, may provide the co-randomised composition, with palm oil or other palmitic fat in the invention, although they are used in minor amounts as for additive oils in the interesterified blends of the invention.

The consistency of margarines may be expressed by reference to their penetration values and dilatation values in the region of their melting point.

Dilatation values express the solids content of the fat. The fats of soft margarines exhibit dilatation values at 10°C of 500 – 550, corresponding to a solids content of 20% – 22% and at 20°C of about 275, i.e., solids content 11%. With the soft margarines provided by the invention, a relatively shallow temperature/solids content curve is possible in which even at 30°C the dilatation value is at least 90, equivalent to solids content 3.6%, while the dilatation at 35°C is no more than 90, providing satisfactory mouth feel.

A full account of the method of determining dilatation values is given in J. Am. Oil Chem. Soc., (1954), 31, pp 98 – 103.

Margarine consistency may also be expressed by reference to the penetration or C values. These are obtained by measuring the depth of penetration in $mm^{-1}$ in margarine after 5 seconds, by an inverted cone loaded with an 80 gram weight and having a blunted point with a cone angle of 40° ± 10°. From this measurement $P_{mm}^{-1}$ the penetration value is obtained according to the formula $$C \text{ (in grams/cm}^2\text{)} = \frac{k \times \text{total cone weight}}{P^{1.6}}$$

where $k$ is a function of cone weight. The difference in consistency at 5°C and 20°C should be represented in the products of the invention by a fall of about 300 units or more. In addition, provided a value of 800 units is not substantially exceeded at 5°C, then the product may be spread straight from the domestic refrigerator. On the other hand, low values may reflect excessive oiliness in the product.

These penetration and dilatation characteristics are provided in the products, of the invention by a judicious selection of the vegetable oils and their proportions with which the palm oil or other palmitic fat may be interesterified.

In the margarine fats of the invention those liquid vegetable oils are preferred in substantially equal proportions co-randomised with palm oil, which without substantially changing the dilatation of the blend upon interesterification nevertheless markedly improve the penetration values. Soybean oil both hardened and unhardened is therefore preferred. Other oils or fats in lesser proportion may be included in the formulation of the margarine fat, either simply blended or corandomised with the other two components, to obtain a predetermined consistency, but preferably these do not exceed 10% of the total fat weight.

The palmitic fat may be randomised either batchwise or in continuous fashion, for example in accordance with the method described in our co-pending case L.267. As catalyst there may be employed an alkali metal, or hydroxide, or alkoxide thereof, preferably a lower alkoxide eg methoxide or ethoxide. The alkali metal is suitably sodium, although other alkali metals eg lithium or potassium, their hydrides, hydroxides and alkoxides may be used.

In accordance with the customary practice in interesterification processes, moisture should be rigorously excluded from the reaction, and the free acid content of the palm oil blend should be low, to minimise the production of soap by-product. A suitable catalyst concentration is about 0.01%, but quantities from 0.001 to 0.1% are also effective. It is desirable to use as little catalyst as convenient, thus simplifying the purification of the interesterified product. The randomisation reaction proceeds very rapidly, although an appreciable induction period may be incurred. The oil blend should therefore be vigorously agitated at elevated temperature, preferably from 50°– 100°C, while the catalyst is introduced. This may conveniently be in the form of a concentrate in a suitable liquid medium, preferably the parent alcohol for an alkali metal alkoxide, e.g., sodium methoxide in methanol. Alkali metals themselves may be introduced dispersed in an inert vehicle such as xylene.

An effective check to confirm that the interesterification reaction has proceeded may be made by comparing the rate of crystallisation of the product with that of the original blend before interesterification. The effect of interesterification is to suppress the slow crystallisation tendency of palm oil. Accordingly, similiar samples are chilled in dilatometers under the same conditions by immersion into ice and the rate of crystallisation compared by dilatation readings taken at intervals.

The margarine fat may be made up into a margarine by emulsifying an aqueous phase in suitable proportions into the fat and chilling and working the fat in orthodox fashion. The aqueous phase may contain additives which are customary for margarine, for example an emulsifying agent, e.g., lecithin and mono- and diglycerides of long-chain fatty acids, and salt. Oil-soluble additives, e.g., butter-like flavouring agents and vitamins, may be included in the oil phase. The aqueous phase may additionally contain milk solids and may consist at least in part of milk, including milk substitutes, e.g., soya milk.

The proportions of aqueous and oil phases may conform to the statutory requirements for margarine. Alternatively a higher proportion of aqueous phase may be adopted in the production of a low fat spread containing as little as 40 wt. % fat, or even less.

The emulsion is preferably worked and chilled in continuously operating scraped surface heat exchange units known as "Votator" units, from which it may be packed directly into retail-sized packages.

It will be understood however that fats suitable for use as shortenings, having the advantages of being easy to work directly after storage from the refrigerator, may also be prepared in accordance with the invention by randomisation of blends of palm oil with a liquid vegetable oil, either of which has been isomerised.

The invention will be further described in the following examples.

EXAMPLE I

Soybean oil (I.V. ca 130) refined by washing with aqueous alkali and water, was boiled with aqueous solutions of soda ash and sodium silicate, subsequently washed with water, dried and bleached. The iodine value was then decreased by about 20 units by batchwise hydrogenation. The dilatations of the hydrogenated soybean oil were as follows:

$D_{10} = 200 \pm 30$, $D_{20} = 80 \pm 20$. Its trans content was about 10% and its slip melting point was 28°C.

Equal parts by weight of refined palm (I.V. 45 – 50) and the hydrogenated soybean oil were blended, alkali-treated to a free fatty acid content less than 0.1%, and dried to a moisture content (Karl Fischer method) of less than 0.02%.

The vigorously stirred blend of oils was randomised at 95°C., using 0.01 wt % of sodium methoxide, in the form of a methanolic solution. The randomised blend was washed dried, bleached with fuller's earth, filtered and deodorised. Its saturated fatty acid content was less than 35%. Little change in dilatation took place upon interesterification.

On cooling to about 60°C margarine vitamin and flavouring additives were incorporated into the randomised oil blend, together with 0.1 wt % of lecithin and 0.3 wt % of monoglyceryl palmitate as emulsifier.

An aqueous phase containing 1.25 wt % salt and 1 wt % milk solids (non-fat) was emulsified in an amount of 16 wt % into the fat. The amounts of ingredients are all expressed with reference to the total margarine formulation. The emulsion was worked and chilled by passage through "Votator" A and B units following a pre-crystalliser unit. At an outlet temperature from the final unit of about 10°C the product was pour-packed into retail ½ lb tubs.

The margarine product showed a penetration $C_5$ substantially below 800. It could be spread directly after storage in a domestic refrigerator and proved pleasantly free from oiliness at ambient temperatures up to about 65°F. In flavour it appeared free from graininess and exhibited a non-cloying taste. The margarine fat had a trans content of about 5% and the following dilatations $D_{10}$ 550, $D_{20}$ 300, $D_{30}$ 125, $D_{35}$ 75.

EXAMPLES 2 – 7

In these examples margarine fat was prepared by co-randomising palm oil refined as in Example 1 with a variety of liquid oils. The trans acid content was provided by previously hardening the palm oil to a slip M Pt of 45°C, either in part (Examples 2, 4 and 5) or the entire palm oil (Example 6), or by hardening part or all of the liquid oil component, in the case of soybean oil to 28°C (Example 3) or 38°C (Examples 7 and 8). In other respects the procedure adopted for Example 1 was followed. Further particulars are given in Table 1, from which it is evident that, while all the blends show $D_{35}$ <90, indicating that where the product margarine contains less than about 35% total saturated fatty acids, it is thin-melting in the mouth. The dilatations at lower temperatures show evidence of good spreadability, both at ambient temperatures and at 5°C ie straight from a domestic refrigerator. These properties were confirmed by the behaviour of the margarine. By comparison with control tests in which trans acid was omitted from otherwise closely comparable compositions, a more favourable relationship between the $D_{20}$ and $D_{35}$ in the margarine fats according to the invention was observed, the latter increasing more slowly in the presence of trans acid as the $D_{20}$ value increased with change in fat composition.

It will be observed also that with increasing trans acid conten content the dilatations at lower temperatures tend to rise, even where the saturated fatty acids content falls.

The fatty acid analysis of these examples is given in more detail in Table 2.

Table 2

| Example | Saturated wt % | | | Unsaturated wt % | |
|---|---|---|---|---|---|
| | P | S | O | L | E |
| 2 | 30.9 | 5.1 | 39.8 | 19.0 | 5.2 |
| 3 | 27.5 | 8.0 | 40.6 | 17.8 | 5.7 |
| 4 | 31.7 | 6.0 | 32.9 | 18.7 | 10.7 |
| 5 | 31.0 | 6.1 | 24.5 | 27.7 | 10.7 |
| 6 | 26.6 | 15.9 | 37.2 | 17.8 | 12.5 |
| 7 | 22.2 | 8.6 | 31.9 | 21.4 | 14.9 |
| 8 | 20.7 | 9.9 | 33.1 | 15.8 | 20.4 |

P = Palmitic
S = Stearic
O = Oleic
L = Linoleic
E = Elaidic (Trans)

EXAMPLE 8

This example was carried out to demonstrate that good oral response can be combined with satisfactory hardness at 20°C, giving good spreadability at that temperature, when in accordance with the invention sufficient trans acid is present in the fat. Further particulars of the product were as follows:

```
Wt % Palm                    51
Wt % hardened soybean oil    49 (as in Ex. 3) }   Randomised
Wt % fatty acid composition                      Total S.F.A.
                Stearic       8.0 }
                Palmitic     27.5 }      35.5
                Oleic        40
                Linoleic     17.8
                Trans oleic   5.7
```
Dilatations $D_0$ 695; $D_{10}$ 595; $D_{20}$ 325; $D_{30}$ 135; $D_{35}$ 50

The margarine was prepared as follows:

An emulsion of the melted fat with 20% aqueous phase and including flavouring agents, salt, milk and emulsifiers in customary amounts, was prepared at 41°C and passed at a rate of 3 Kg/hour through successively, a series of scraped surface tubular units in the first of which the emulsion was admixed with 75% recirculated crystallised material and was agitated at 250 rpm.

From this recrystalliser the slightly cooled emulsion was transferred in part to the second unit, provided by a Votator A unit agitated at 800 rpm and from there to an uncooled post-crystalliser unit also agitated. The remaining part issuing from the A unit was recirculated as described, to the precrystalliser.

Table 1

| Group | Wt % palmitic fat | Wt % liquid oil | | | Acids Wt % | | | DILATATION VALUES | | | | | | |
|---|---|---|---|---|---|---|---|---|---|---|---|---|---|---|
| | | BO | SUN | Olive | SFA | | Trans | | | | | | | |
| | PALM | | | | Palm | Total | | 0° | 10° | 15° | 20° | 25° | 30° | 35° |
| 2 | 38/18 | | 21 | 23 | 30.9 | 36.0 | 5.2 | 655 | 570 | 415 | 300 | 195 | 110 | 10 |
| 3 | 51 | 49+ | | | 27.5 | 35.5 | 5.7 | 695 | 595 | 445 | 325 | 205 | 135 | 50 |
| 4 | 21/37* | | 24 | 18 | 31.7 | 37.7 | 10.7 | 780 | 695 | 535 | 405 | 275 | 165 | 70 |
| 5 | 22/37* | | 41 | | 31.0 | 37.1 | 10.7 | 700 | 635 | 480 | 370 | 260 | 155 | 65 |
| 6 | 43* | | 23 | 34 | 26.6 | 32.5 | 12.5 | 650 | 550 | 390 | 275 | 165 | 75 | 10 |
| 7 | 31 | 41+ | 28 | | 22.2 | 30.8 | 14.9 | 730 | 640 | 480 | 360 | 230 | 125 | 30 |
| 8 | 25 | 56+ | 19 | | 20.7 | 30.6 | 20.4 | 860 | 785 | 640 | 490 | 370 | 185 | 65 |

*Hardened to slip M Pt 45°C
*Hardened to slip M Pt 28°C
SFA = Saturated fatty acids
BO = Soybean oil
+Hardened to slip M Pt 38°C
SUN = Sunflower oil The fatty acid analysis of these Examples is given in more detail in Table 2.

Coolant was circulated to the A unit at 0°C.
The softness of the product, measured by determining penetration values as already described, one week after preparing the margarine, was increased by increasing the speed of the postcrystalliser agitator, from 250 to 700 rpm. This produced, as regards the other process conditions, an increase in precrystalliser inlet temperature from 27° to 28°C and that of the post crystalliser outlet from 11.5° to 12°C, against a fall in its inlet from 11° to 8°C.

The change in C values was as follows:

| | | |
|---|---|---|
| $C_5$ | 1540 – 850 | g/cm² |
| $C_{10}$ | 1150 – 600 | g/m² |
| $C_{20}$ | 75 – 55 | g/cm² |

A penetration value of about 1,000 is too high for easy spreading on bread. The decreases thus show that by increased working the margarine is made more plastic and can then readily be spread at these temperatures, without materially affecting the condition of the margarine at 20°C, which in both cases is very soft but not pourable.

A range of margarines were also prepared from interesterified blends of palm sunflower and olive oil in which the principal saturated fatty acid was randomised palmitic acid, but omitting trans acid. It was found impossible to obtain from these fat compositions the combination of their melting and adequate body at 20°C indicating good spreadability at that temperature, shown by D20 275 and D35 90, shown by the product of Example 8.

EXAMPLES 9 AND 10

In these examples the effect is demonstrated of decreasing the total saturated fatty acid content to about 35%. For this purpose, the conditions employed in Examples 2 – 7 were repeated for the preparation of two samples of margarine based on palm oil, sunflower oil and soybean oil hardened to 38°C in the proportions 55; 20; 25 (Example 9) and 45; 30; 25 (Example 10), interesterified as previously described. Further details of the margarine products appear in Table 3.

While both margarines were satisfactory, showing good melting characteristics, the lower total saturated fatty acids content in Example 9 is reflected in the dilatation characteristics of the fat, confirming that the margarine could be spread directly from the refrigerator and is thin melting.

EXAMPLE 11

In this Example a major porportion of the palmitic acid content of a margarine fat according to the invention was provided by cottonseed oil, in a formulation of 20 : 45 : 35 parts by weight of palm cottonseed and soybean oil, the latter hardened to 38°C.

Further particulars appear in Table 4, and demonstrate that palmitic fats generally may be used to provide the palmitic acid requirements of the invention.

Table 4

| Fatty Acids wt % | | | | | Dilatations | | | | | | | Penetration values g/cm² | | | |
|---|---|---|---|---|---|---|---|---|---|---|---|---|---|---|---|
| SFA | P | S | O | L | Trans | 0° | 10° | 15° | 20° | 25° | 30° | 35°C | 5 | 10 | 15 | 20°C |
| 32.9 | 23.8 | 7.0 | 38.6 | 27.1 | 14 | 595 | 585 | 455 | 335 | 230 | 115 | 30 | 980 | 490 | 270 | 47 |

EXAMPLES 12 and 13

In these Examples margarine samples were prepared based on interesterified blends of equal parts of palm and corn oil. The trans content was provided by partly hydrogenating the corn oil in Example 12 before randomisation, and in example 13 by partly hardening the blend after randomisation. Further particulars appear in Table 5.

Table 5

| Example | Fatty acids wt % | | | | | | Dilatations | | | | | | |
|---|---|---|---|---|---|---|---|---|---|---|---|---|---|
| | SFA | P | S | O | L | Trans | 0 | 10 | 15 | 20 | 25 | 30 | 35°C |
| 12 | 34.9 | 27.2 | 6.6 | 42.8 | 21.1 | 5.5 | 700 | 640 | 490 | 380 | 275 | 180 | 100 |
| 13 | 36.9 | 30.7 | 5.1 | 37.7 | 24.4 | 5.0 | 625 | 585 | 440 | 315 | 225 | 100 | 60 |

Both examples show a favourable relationship between the dilatations at 20°C and 35°C. The product of Example 12 in addition is thin melting at 35°C.

The Examples demonstrate that the trans acid content of the compositions according to the invention may be introduced before or after interesterification.

What is claimed is:

1. A process for producing margarine having improved spreading characteristics which comprises:
   i. preparing a fat phase by performing in either order the steps of:
      a. corandomising at a temperature of from 50° to 100°C a blend consisting essentially of 25–65 wt % of a palmitic fat with 75–35 wt % of a $C_{16}$-$C_{18}$ vegetable oil in the substantial absence of water and in the presence of an effective amount of an alkali metal catalyst; and
      b. partially hardening at least one of the components of the blend in the presence of an effective

TABLE 3

| Example | Fatty Acid Analysis wt % | | | | | Dilatations | | | | | |
|---|---|---|---|---|---|---|---|---|---|---|---|
| | SFA | P. | S. | O. | L. | Trans | 0 | 10 | 20 | 25 | 30 | 35°C |
| 9 | 38.8 | 28.8 | 8.5 | 34.4 | 18.7 | 9.1 | 855 | 785 | 470 | 320 | 210 | 110 |
| 10 | 33.8 | 25.4 | 6.6 | 40.8 | 24.5 | 10 | 615 | 600 | 325 | 190 | 110 | 40 | amount of a metal hydrogenation catalyst under isomerisation conditions, and continuing the said steps until the combined fatty acid content of the glycerides of the blend consists essentially of at least 3% trans acid and at most 35% saturated fatty acid, of which palmitic acid predominates, these amounts being by weight of the total combined fatty acid content, and its dilatation value at 20°C is at least 275 and at 35°C at most 90;

ii. incorporating into the fat phase an aqueous phase including flavours and an effective amount of a water-in-oil eumlsifier at an elevated temperature at which both phases are liquid;

iii. emulsifying the phases to form a water-in-oil emulsion; and iv. passing said emulsion successively through a scraped surface heat exchanger and a scraped surface mixer in which the emulsion is chilled and tempered to crystallise at least part of the fat phase.

2. A process for the preparation of a soft margarine capable of being spread at domestic refrigerator temperatures, the process including the steps of:

i. refining, washing, drying and bleaching soyabean oil;

ii. selectively hardening the resulting soyabean oil to a melting point of about 28°C and a combined trans fatty acid content of about 10 wt % of the total combined fatty acids thereof;

iii. blending approximately equal amounts by weight of the resulting soyabean oil and a palmitic fat selected from palm and cottonseed oil;

iv. neutralising and drying the resulting blend to provide a moisture content of at most 0.02 wt % and a free fatty acid content less than 0.1% by weight;

v. randomising the dry, neutralised blend at a temperature of 50°-100°C in the presence of an alkali metal alkoxide catalyst;

vi. removing the catalyst, drying, bleaching and filtering the randomised blend;

vii. emulsifying by weight about 16 parts of an aqueous phase containing margarine flavouring and additives into about 84 parts of the resulting blend in the presence of an emulsifier, at an elevated temperature at which both phases are liquid;

viii. chilling, working and tempering the emulsion in a series of scraped surface heat exchangers at a temperature at which at least part of the fat crystallises;

ix. recirculating a proportion of the crystallised emulsion; and x. pour-packing the product in retail containers.

3. A process according to claim 1, wherein said palmitic fat is selected from palm and cottonseed oil.

4. A process according to claim 1, wherein the vegetable oil is selected from the group consisting of sunflower, safflower, groundnut, cottonseed, melonseed, rapeseed, olive and soyabean oil.

5. A process according to claim 1, wherein the said fat phase consists of about equal amounts by weight of palmitic fat and vegetable oil.

6. A process according to claim 4, wherein the vegetable oil consists of soyabean oil hardened to a slip melting point from about 25° to about 40°C.

* * * * *

UNITED STATES PATENT OFFICE
CERTIFICATE OF CORRECTION

PATENT NO. : 3,889,011
DATED : June 10, 1975
INVENTOR(S) : Colin Barrington Read It is certified that error appears in the above-identified patent and that said Letters Patent are hereby corrected as shown below:

Column 5, line 39, change "L.267" to --Serial No. 298,075--.

*Signed and Sealed this* sixteenth *Day of* March 1976

[SEAL]

*Attest:*

RUTH C. MASON
*Attesting Officer*

C. MARSHALL DANN
*Commissioner of Patents and Trademarks*